United States Patent
Hamilton, II et al.

(10) Patent No.: US 8,031,595 B2
(45) Date of Patent: Oct. 4, 2011

(54) FUTURE LOCATION DETERMINATION USING SOCIAL NETWORKS

(75) Inventors: Rick A. Hamilton, II, Charlottesville, VA (US); Neil A. Katz, Parkland, FL (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 11/842,214

(22) Filed: Aug. 21, 2007

(65) Prior Publication Data

US 2009/0054043 A1   Feb. 26, 2009

(51) Int. Cl.
*H04L 12/26* (2006.01)
(52) U.S. Cl. .................................................. 370/230
(58) Field of Classification Search .................. None
See application file for complete search history.

(56) References Cited

U.S. PATENT DOCUMENTS

| | | |
|---|---|---|
| 5,572,221 A | 11/1996 | Marlevi et al. |
| 6,263,208 B1 | 7/2001 | Chang et al. |
| 6,564,065 B1 | 5/2003 | Chang et al. |
| 6,681,108 B1 | 1/2004 | Terry et al. |
| 6,701,153 B1 | 3/2004 | Chang et al. |
| 6,748,233 B1 * | 6/2004 | Arnold et al. ............... 455/522 |
| 6,889,053 B1 | 5/2005 | Chang et al. |
| 2002/0092026 A1 | 7/2002 | Janniello et al. |
| 2003/0115421 A1 | 6/2003 | McHenry et al. |
| 2004/0017310 A1 * | 1/2004 | Vargas-Hurlston et al. ................... 342/357.1 |
| 2005/0114759 A1 | 5/2005 | Williams et al. |
| 2005/0138196 A1 | 6/2005 | Pfeffer et al. |
| 2005/0177614 A1 | 8/2005 | Bourne |
| 2005/0198328 A1 | 9/2005 | Lee et al. |
| 2006/0020671 A1 | 1/2006 | Pike et al. |
| 2006/0064346 A1 | 3/2006 | Steenstra et al. |

(Continued)

FOREIGN PATENT DOCUMENTS

CN         1109455 C       5/2003

OTHER PUBLICATIONS

Srinivasan et al., "PeopleNet: Engineering a Wireless Virtual Social Network", ACM, MobiCom 2005, Aug. 28-Sep. 2, 2005, Cologne, Germany (2005).

(Continued)

*Primary Examiner* — Raj Jain
(74) *Attorney, Agent, or Firm* — Cuenot, Forsythe & Kim LLC

(57) ABSTRACT

A computer-implemented method of predicting a future location of a mobile node can include determining a current location of a first mobile node, determining a location of at least a second mobile node, wherein the second mobile node is associated with the first mobile node via a social network, and generating a list including at least one candidate destination determined, at least in part, according to the location of the first mobile node and the location of the second mobile node. For each candidate destination on the list, a probability that the first mobile node is in route to that candidate destination location can be calculated. A candidate destination can be selected, according to the probabilities, from the list as a predicted future location of the first mobile node. The predicted future location of the first mobile node can be output.

20 Claims, 3 Drawing Sheets

U.S. PATENT DOCUMENTS

2006/0069501 A1* 3/2006 Jung et al. .................... 701/209
2006/0075139 A1 4/2006 Jungek
2006/0085419 A1 4/2006 Rosen

OTHER PUBLICATIONS

Consolvo et al., "Location Disclosure to Social Relations: Why, When, & What People Want to Share", ACM, CHI 2005, Apr. 2-7, 2005, Portland, Oregon, USA (2005).

Lee et al., "Modeling Steady-state and Transient Behaviors of User Mobility: Formulation, Analysis, and Application", ACM, MobiHoc 2006, May 22-25, 2006, Florence, Italy (2006).

Gosh et al., "On Profiling Mobility and Predicting Locations of Wireless Users", ACM, Realman 2006, May 26, 2006, Florence, Italy (2006).

Karam et al., "Putting Systems into Place: A Study of Design Requirements for Location-Aware Community Systems", (2004).

Lauw et al., "Mining Social Network from Spatio-Temporal Events", Workshop on Link Analysis, Counterterrorism and Security, Newport Beach, California (Apr. 23, 2005).

Das et al., "Adaptive Location Prediction Strategies Based on a Hierarchical Network Model in a Cellular Mobile Environment", The Computer Journal, 42(6), pp. 473-486 (1999).

Karakaya, "Improving Broadcast Scheduling Performance through Movement Prediction, Data Staging, and Ad Hoc Networking", Thesis Proposal, Department of Computer Engineering, Bilkent University (2002).

Cheng et al., "Location Prediction Algorithms for Mobile Wireless Systems", Wireless Internet Handbook: Technologies, Standards, and Application, CRC Press, Inc., Boca Raton, Florida, USA, pp. 245-263 (2003).

Hamilton et al., Pending U.S. Appl. No. 11/608,859, filed Dec. 12, 2006.

* cited by examiner

FUTURE LOCATION DETERMINATION USING SOCIAL NETWORKS

BACKGROUND OF THE INVENTION

Portable computing devices allow users to perform computing tasks virtually anywhere. The development of cost effective mobile communication technologies allows these portable computing devices, e.g., mobile nodes, to access communication networks from virtually any location the user chooses to operate such a device. The ease with which mobile nodes can move about while maintaining network connectivity can influence usage characteristics of a given communication network. For example, the number of users on a communication network may remain constant or high despite the fact many users are not physically present at a given facility, e.g., are working remotely.

The manner in which users access a communication network and/or computing system can have a significant effect on the performance and reliability of that system. One aspect of managing system performance can involve attempting to anticipate future computing needs of users and providing sufficient resources to accommodate those needs at the appropriate time. Anticipating user needs can depend upon the location of users within a given computing system.

BRIEF SUMMARY OF THE INVENTION

The embodiments disclosed herein relate to predicting the location of a mobile node at some time or point in the future. One embodiment of the present invention can include a computer-implemented method of predicting a future location of a first mobile node. The method can include determining a location of at least a second mobile node, wherein the second mobile node is associated with the first mobile node via a social network, and generating a list including at least one candidate destination determined, at least in part, according to the location of the first mobile node and the location of the second mobile node. For each candidate destination on the list, a probability that the first mobile node is in route to that candidate destination can be calculated. A candidate destination can be selected, according to the probabilities, from the list as a predicted future location of the first mobile node. The predicted future location of the first mobile node can be output.

Another embodiment of the present invention can include a computer-implemented method of predicting a future location of a mobile node. The method can include determining a location for each of a plurality of mobile nodes associated with a base mobile node through a social network and, for each of the plurality of mobile nodes, identifying at least one candidate destination within a predetermined distance of the mobile node. For each candidate destination, a probability that the base mobile node is in route to the candidate destination, at least in part, according to a measure of connectivity between the base mobile node and the mobile node associated with each respective candidate destination. The method can include selecting a candidate destination, according to the probabilities, as a predicted future location of the first mobile node and outputting the predicted future location of the base mobile node.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
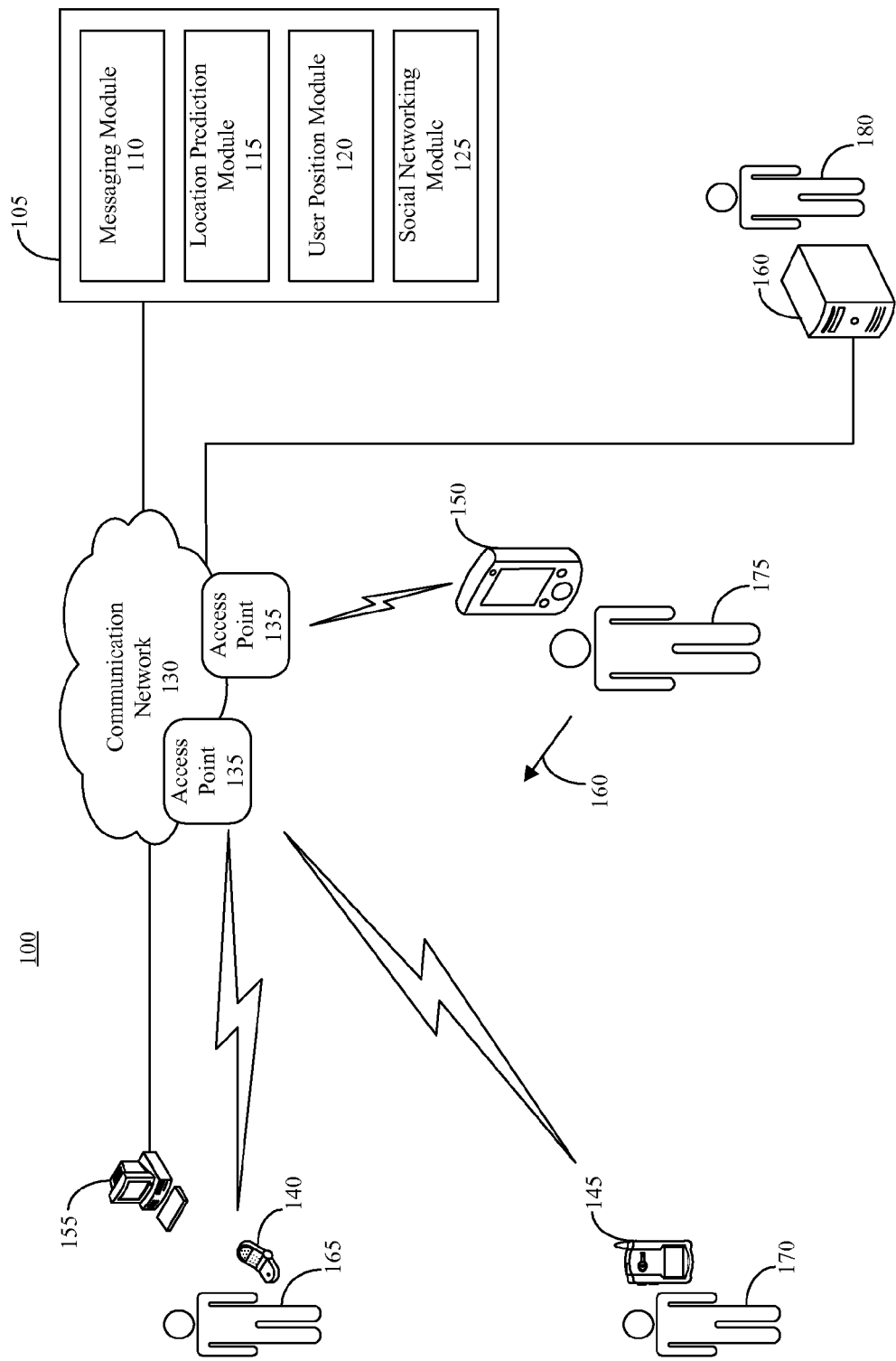
FIG. 1 is a schematic diagram illustrating a system for predicting a future location of a mobile node in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, magneto-optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk —read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to predicting a future location of a mobile node through the use of social networking techniques. A social network, in general, refers to the personal or professional set of relationships between individuals. Social networks can represent both a collection of ties between people and the strength of those ties. For example, a social network can specify a measure of connectivity of a user to other user in terms of physical proximity to others, frequency of social contact, time spent in proximity with one another, and the type of relationship that exists between two or more persons, e.g., spousal, confidant, relative, friend, group, etc. The connectivity among users of a social network can be used to aid in the prediction of a future location of a user in the context of a mobile network.

Throughout this specification reference is made to the location of a user or the location of a mobile node, e.g., a communication device of a user or a communication device associated with a user. The phrases "mobile node," "communication device," "mobile device," and/or "user" may be used interchangeably within this specification in the sense that the location of a mobile node can be used as a proxy for the location of the user associated with that mobile node. Accordingly, if the location of a mobile node is determined, it is assumed that the user associated with that mobile node is located at or near the same location, has the same heading, etc., as the mobile node. Further, when an association exists between two or more mobile nodes, it can be said that each user associated with one of the mobile nodes has an association with the other mobile nodes or users of those mobile nodes, e.g., is within a same social network.

FIG. 1 is a schematic diagram illustrating a system 100 for predicting a future location of a mobile node in accordance with one embodiment of the present invention. As shown, the system 100 can include a location prediction system 105 coupled to a communication network 130. One or more access points 135 can be included which support wireless communications with one or more mobile nodes 140, 145, and 150. As is known in the art, the access points 135 can establish wireless communications with the mobile nodes 140-150 to facilitate communication between the mobile nodes 140-150, the communication network 130, and the location prediction system 105. One or more information processing systems 155 and 160, e.g., computers, also can be included which can be communicatively linked with the communication network 130.

The communication network 130 can be implemented as, or include, without limitation, a WAN, a LAN, the Public Switched Telephone Network (PSTN), the Web, the Internet, and one or more intranets. The communication network 130 further can include one or more wireless networks, whether short or long range. For example, in terms of short range wireless networks, the communication network 130 can include a local wireless network built using Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 130 can include a mobile, cellular, and or satellite-based wireless network and support voice, video, text, and/or any combination thereof, e.g., GSM, TDMA, CDMA, and/or WCDMA network.

The access points 135 can be configured to support one or more of the above communication protocols, whether short or long range. For example, the access point 135 can be implemented as an 802.xx-type access point, as a mobile or cellular access point, e.g., a base station, or the like. Each of the mobile nodes 140-150 can be a portable communication device capable of establishing a wireless communication link with one of the access points 135. For example, a mobile node can include, but is not limited to, a mobile telephone, a Wi-Fi enabled device, a text-messaging enabled device, etc.

Each of the mobile nodes 140-150 can be associated with, or belong to, a user. As shown, user 165 is associated with mobile node 140. User 170 is associated with mobile node 145. User 175 is associated with mobile node 150. As another example, user 180 can be associated with information processing system 160, which may not be a mobile device.

For purposes of illustration, it can be assumed that each of users 165-180 can be positioned at different locations. As such, each of mobile nodes 140-150 can be located at a distinct and different physical location encompassed by the coverage of the communication network 130. Information processing systems 155 and 160 also may be located at distinct and different physical locations. For example, the communication network 130 can cover an extended geographic area, whether a city, a state, a region comprising a plurality of states, or the like. In one arrangement, the communication network 130 can be a global network. The mobile nodes 140-150 and information processing systems 155-160 can be distributed throughout that geographic area.

The location prediction system 105 can be implemented as an information processing system, e.g., a computer or server, or as one or more distributed information processing systems. The location prediction system 105 can include a network adapter (not shown) that communicatively links the location prediction system 105 with the communication network 130.

The location prediction system 105 can include a messaging module 110, a location prediction module 115, a user position module 120, and a social networking module 125. Each of the modules 110-125 can be implemented as a computer program executing within the location prediction system 105. It should be appreciated that while the modules 110-125 are pictured as if located within a single information processing system, one or more or each of the modules 110-125 can be disposed within a separate, e.g., distributed, information processing system where such systems are configured to function as a single, unified system.

The messaging module 110 can, responsive to instructions received from one or more of the other modules 115-125, generate messages to be sent via the communication network 130. For example, the messaging module 110 can be configured to generate and send electronic mail messages, instant messaging messages or text messages, place telephone calls using a text-to-speech system or prerecorded voice prompts, send facsimile messages, or the like.

The location prediction module 115 can predict the location of a user at some point in the future. In predicting the future location of a mobile node, e.g., mobile node 150, also referred to as the base mobile node, the location prediction module 115 can utilize a variety of different techniques, as will be described herein in greater detail. In one embodiment, the location prediction module 115 can utilize social networking to aid in predicting future locations of mobile nodes. For example, in cases where a selected user has affiliations or relationships with one or more other users having a presence on communication network 130, the locations of the other users or locations associated with the other users can be utilized in predicting the future location the selected user. Locations associated with other users in the same social network can be considered more pertinent or likely to be visited by user 175 than other locations not associated with a user within the social network.

The user position module 120 can store location information for one or more mobile nodes having presence on the communication network 130. In one embodiment, the user position module can include the necessary equipment for determining user location, e.g., Global Positioning System (GPS) unit receiving coordinates from mobile nodes 140-150, where such units are GPS enabled, wireless triangulation equipment, or the like. The location of other nodes, whether mobile or stationary, can be preprogrammed, e.g., information processing system 155 and 160. In another embodiment, the user position module 120 can serve as a location information repository that can be updated from time-to-time or periodically by another module or system capable of determining locations of mobile and/or non-mobile nodes having a presence on the communication network 130.

The user position module 120 also can be configured to determine a heading, e.g., heading 160, of a mobile node such as mobile node 150. A heading can be determined, for example, based upon a histogram of mobile device location information specifying location and time stamp information, e.g., date and/or time, for each location. As used herein, a "heading" can refer to, or specify, a direction and/or a velocity at which an object travels in the indicated direction.

Historical information relating to the travels of a mobile node also can be stored. For example, the user position module 120 can store locations that have been previously visited by mobile node 150. The storage of previously visited locations can include the number of times the mobile node 150 has visited each location over a specified period of time, e.g., frequency, the dates and/or times that the mobile node 150 visited the locations, and the like.

Another variety of historical information that can be stored by the user position module 120 can include one or more routes previously taken by the mobile node 150 in reaching specified, e.g., historically visited or registered, locations or destinations. In terms of storing routes, the user position module 120 can include mapping information that can be used in conjunction with other items of location information described herein. Mapping information allows a route to be characterized or specified in terms of particular roadways and further facilitates the ability to determine one or more alternate routes for a specified route or destination. Mapping information further can include traffic information specifying traffic congestion, known speed limits, construction areas, and other information that may influence the manner in which one travels or utilizes a given roadway.

Though historical information can be stored, it should be appreciated that users also may, through a suitable interface, access the user position module 120 to register one or more locations that he or she expects to visit or routinely visits. Scheduling information specifying dates and/or times of likely visits for each stored destination also can be specified. Schedule information within the user position module 120 may also be more general in nature, e.g., labeling a location as "work" or "personal." Scheduling information further can specify particular days and/or hours that one works, travels, or performs any of a variety of other activities to facilitate a comparison of destinations with the schedule. For example, work locations can be favored for entry onto the list of candidate destinations if a comparison of the current time with the schedule indicates that the mobile node 150 is traveling during "work hours."

The social networking module 125 can store social network information relating to one or more users or mobile nodes on the communication network 130. The social network information can specify associations of users, e.g., users said to be within one's social network. In specifying a relationship between two or more users in this manner, it should be appreciated that a listing of the mobile node belonging to, or associated with, each user can be specified such that any association between two users further creates an association between the mobile nodes of the users.

The social network can be specified as a list of one or more users associated with a given user. A social network also can be specified as a graph where each user is depicted as a node and relationships among users are depicted as branches linking or connecting the nodes. Despite the manner in which the social network is represented, associations among users can be specified that define which users are within another user's social network. The social network information stored within the social networking module 125 may be less detailed or more detailed, e.g., specifying strength and/or other measures of connectivity among users or the like.

In operation, user 175 associated with mobile node 150 can leave a particular location, e.g., the home or office of user 175. The location prediction system 105 can determine that the user is leaving by monitoring the whereabouts of the mobile node 150. Responsive to determining that the mobile node 150 is leaving a particular location, future location prediction for mobile node 150 can be enabled.

For purposes of illustration, it can be assumed that each of users 165, 170, and 180 are within the social network of user 175. Each of users 165, 170, and 180 further may have a same or a different level of connectivity with user 175. The location prediction module 115, having access to social networking module 125 and user position module 120, can predict a future location of mobile node 150 using any of a variety of different techniques.

In general, a list of candidate destinations can be compiled according to locations of mobile nodes within the social network of mobile node 150. These candidate destinations can be assigned a probability that can be calculated and/or weighted, e.g., adjusted, according to various factors. Candidate locations further can be selected for inclusion on the list according to any of a variety of additional screening techniques that may include, but are not limited to, whether the location was previously visited or near another location previously visited by user 175, whether a location is on or near a previously traveled route of user 175 or a path extending out in a straight line along the heading 160 of user 175, etc. Other techniques for identifying candidate destinations for inclusion on the list may include selecting the location of each of users 165, 170, and 180 as a candidate destination, limiting the candidate destinations to those within a predetermined distance of user 175, limiting candidate destinations to only those within a predetermined distance of any of users 165, 170, or 180.

The candidate destination having the highest probability can be selected as the predicted future location of mobile node 150. Having selected a location, in this example the location of user 165, the messaging module 110 can send a message to mobile node 140 of user 165 or another known computing system that is located at the same location, e.g., information processing system 155.

In one embodiment, the message from the messaging module 110 can be an informative message indicating that user 175 is in route to the location of user 165. In another embodiment, the message can specify instructions for the recipient processing node, whether mobile node 140 or information processing system 155. Such instructions can launch a program, change a status of a program, or instruct the information processing system 155 to adjust another system that is coupled to information processing system 155.

For example, if information processing system 155 is controlling a climate control system, the information processing system 155 can, responsive to receiving the message from the messaging module 110, adjust the temperature of the climate control system in preparation for the arrival of user 175. In another example, one or more programs can be launched on information processing system 155 or another system. In yet another example, a corporate Lightweight Directory Access Protocol (LDAP) directory can be notified of, or updated with, the most recent location of a user or a predicted future location of the user.

Figure 2:
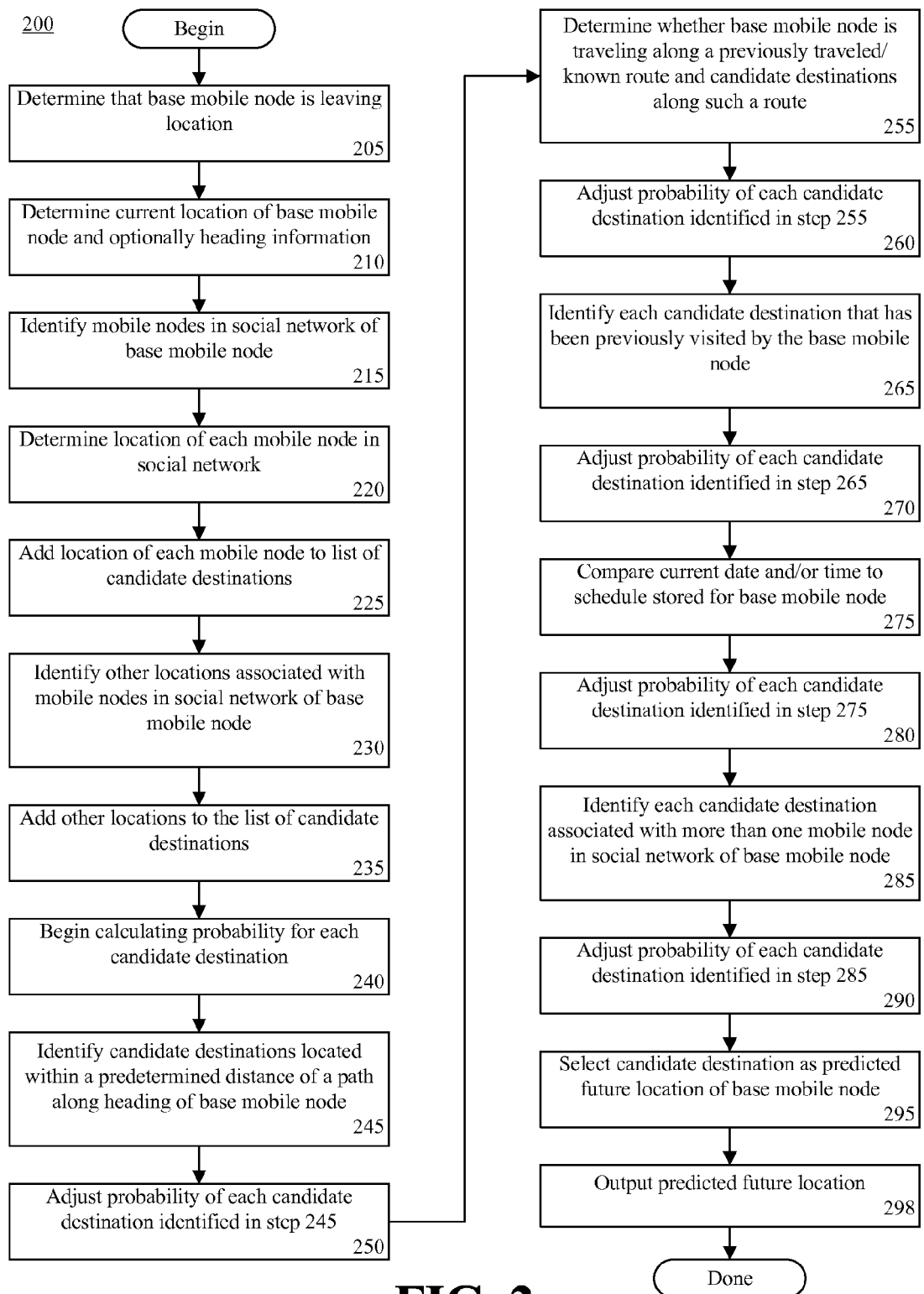
FIG. 2 is a first flow chart illustrating a method of predicting a future location of a mobile node in accordance with another embodiment of the present invention.

FIG. 2 is a flow chart illustrating a method 200 of predicting a future location of a mobile node in accordance with another embodiment of the present invention. The method 200 can be implemented by the location prediction system described with reference to FIG. 1. It should be appreciated that method 200 is presented for purposes of illustration. As such, one or more of the steps may be performed in a different order than presented in the flow chart. Further, one or more of the steps may be optionally performed. For example, the various adjustments to probability have been shown as separate steps for ease of description. It should be appreciated that such steps can be combined into a single larger step within the context of a single larger function. The steps may be performed in a different order, not implemented, or optionally implemented. Moreover, the different aspects of probability determination can be used and/or performed individually or in any combination.

In step 205, a determination can be made that the base mobile node, e.g., the mobile node which a future location prediction is to be made, is leaving or has left a location. For example, one or more locations for the base mobile node can be programmed or otherwise stored in the system such that through continuous location monitoring of the base mobile node the system can determine that the mobile node has left a specified location.

In step 210, a current location of the base mobile node can be determined. Optionally, heading information for the base mobile node can be determined. In step 215, one or more mobile nodes that are part of the social network of the base mobile node can be identified. In step 220, the location for each of the mobile nodes can be determined. In one embodiment, the method 200 can be limited to deal with or involve only those mobile nodes within the social network of the base mobile node that are located within a predetermined distance of the base mobile node. Those that are outside of such an area can be ignored.

In step 225, the location of each of the mobile nodes identified in step 225 can be added to a list of candidate destinations. In step 230, one or more other locations associated with mobile nodes of the social network of the base mobile node can be identified. Associated locations may include locations that have been previously visited by the base mobile node or have been otherwise identified to the location prediction system as being associated with the base mobile node which also are within a predetermined distance of a mobile node in the social network of the base mobile node. In this sense, the location of a mobile node can be said to be "associated" with that mobile node. In step 235, any of the other locations identified in step 230 can be added to the list of candidate destinations.

In step 240, for each candidate destination on the list, the system can begin calculating a probability that the base mobile node is in route to, or will visit, that candidate destination. The probabilities can be determined according to any of a variety of factors as will be described herein in further detail. In one embodiment, the probabilities can be a sum of the individual factors to be discussed herein, where one or more of the factors may be weighted. In that case, a base probability may be established for each candidate destination. For example, a base probability can be determined according to distance of a candidate destination from the base mobile node. In another example, a base probability can be determined according to the strength of connectivity between the base mobile node and the mobile node of the social network of the base mobile node that caused the location to be listed as a candidate destination.

In step 245, any candidate destinations that are located within a predetermined distance of a path that extends along the heading of the base mobile node can be identified. In one embodiment, the path along the heading can be a linear, e.g., straight-line, path. In another embodiment, the path may be a route, as previously discussed, where the heading of the base mobile node coincides with the route. For example, the base mobile node may travel on a heading that is consistent with the direction, location, etc., of a road that is part of a known route. In step 250, the probability of any candidate destination identified in step 245 can be adjusted. In one embodiment, the probability of the candidate locations can be increased. In another embodiment, where proximity to a path of the base mobile node is one factor, that factor can be incremented or weighted within a larger overall probability function.

In step 255, a determination can be made as to whether the base mobile node is traveling along a route that was previously traveled by the base mobile node or another known route. If a route is identified, any candidate destinations from the list that are within a predetermined distance of any point along that route also can be identified. It should be appreciated that the candidate destinations identified in step 255 further can be limited to those within a predetermined distance of the base mobile node. In any case, in step 260, the probability of each candidate destination identified in step 255 can be adjusted as described herein.

In step 265, each candidate destination that has been previously visited by the base mobile node can be identified. In step 270, the probability of each candidate destination from the list that was identified in step 265 can be adjusted as described. In step 275, the current date and/or time can be compared with stored schedule information for the base mobile node. In step 280, the probability of each candidate destination from the list that is consistent with the schedule of the base mobile node can be adjusted as described herein. For example, the probability of a work location can be adjusted higher if the current date and/or time falls within established "working times" per the base mobile node schedule. If the schedule indicates that the base mobile node routinely visits a particular recreational facility on Saturdays, the probability of any recreational facility on the list of candidate destinations can be incremented if the current day is Saturday.

In step 285, each candidate location associated with more than one mobile node of the social network of the base mobile node can be identified. In step 290, the probability of each candidate location identified in step 285 can be adjusted. In one embodiment, the amount by which the probability of a candidate destination can be adjusted will depend upon the number of mobile nodes in the social network that are associated with that candidate destination. For example, a candidate destination associated with three mobile nodes of the social network will have a higher probability than a candidate destination associated with only one or two mobile nodes of the social network.

In another embodiment, the strength of connectivity between the base mobile node and the other mobile nodes may be considered. In that case, a candidate destination associated with a single mobile node of the social network that has a high degree of connectivity with the base mobile node may have a higher probability than a candidate destination associated with two or more mobile nodes of the social network with weaker connectivity to the base mobile node. As noted, connectivity can be calculated according to frequency with which the base mobile node is located with a given mobile node in the social network, amount of time, etc.

In step 295, the candidate destination having the highest probability can be selected as the predicted future location of the base mobile node. In step 298, the predicted future location of the base mobile node can be output. It should be appreciated that the method 200 can be repeated as may be required, e.g., from time-to-time, periodically, responsive to a specified event, etc. Moreover, the location and probabilities can be continually updated as the base mobile node continues to move.

Figure 3:
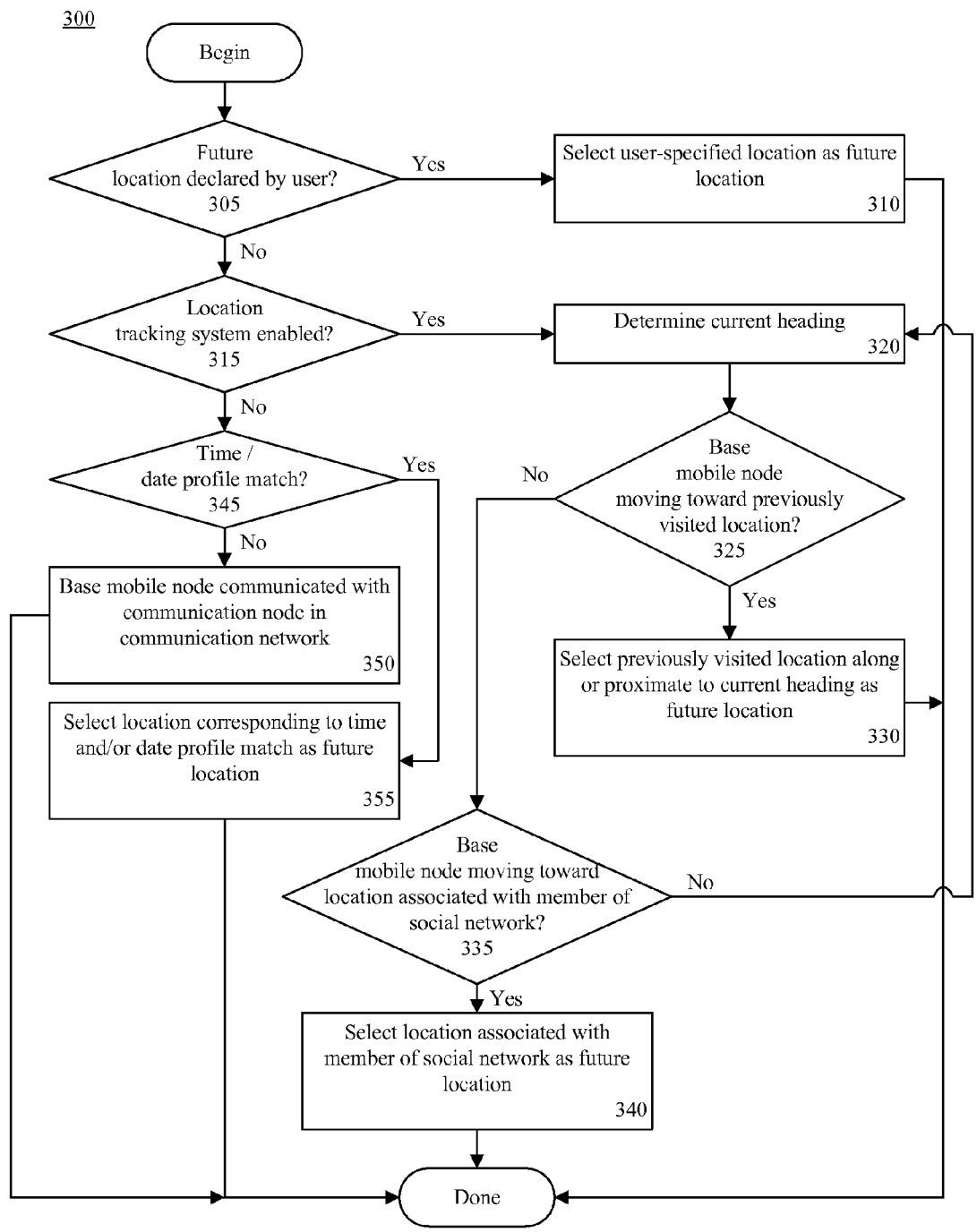
FIG. 3 is a second flow chart illustrating a method of predicting a future location of a mobile node in accordance with another embodiment of the present invention.

FIG. 3 is a flow chart illustrating a method 300 of predicting a future location of a mobile node in accordance with another embodiment of the present invention. The method 300 can be implemented by the system illustrated in FIG. 1. It should be appreciated that the method 300 illustrates one example of how the future location of a mobile node can be determined and, as such, is not intended to limit the present invention in any way or to suggest that only particular techniques or technologies are to be used.

Accordingly, the method 300 can begin in step 305 where a determination is made as to whether the user has declared a future location to the system. If so, the method can proceed to step 310 where the user-specified location is selected as the future location. If the user did not directly specify a location, the method can proceed to step 315.

In step 315, a determination can be made as to whether a location tracking system is enabled for the base mobile node, e.g., GPS functionality capable of transmitting coordinate information. If so, the method can proceed to step 320. If not, the method can continue to step 345. In step 320, a current heading of the base mobile node can be determined. In step 325, a determination can be made as to whether the base mobile node is moving toward any previously visited locations. If so, the method can proceed to step 330, where one of the previously visited locations can be selected as the future location. For example, the previously visited location that is closest to the anticipated path of the user based upon the heading and/or any mapping information can be selected. If the user is not moving toward any previously visited location, the method can proceed to step 335.

In step 335, a determination can be made as to whether the mobile node is moving toward any location associated with a member of a social network to which the base mobile node belongs. If so, the method can continue to step 340. In step 340, a location associated with a member of the social network can be selected as the future location of the user. If the user is not moving toward a location associated with a member of the social network, the method can loop back to step 320 to continue monitoring the heading of the user.

Continuing with step 345, in the case where the location tracking system is disabled, a determination can be made as to whether the time and/or date profile of any previously visited locations of the user match the current time and/or date. If so, the method can proceed to step 355. If not, the method can continue to step 350.

In step 350, the location prediction system can determine whether the base mobile node has communicated with a communication node in the communication network. That is, the system can await a first request for data or a login of the base mobile node and locate the particular processing node to which the request was directed. Once determined, the location of that processing node can be selected as the predicted future location. Alternatively, another known location within a predetermined distance of the communication node can be selected as the predicted future location of the base mobile node. If time and/or date profile information for previously visited locations does correspond with the current time and/or date, the method can proceed to step 355 where the location matching time and/or date profile information can be selected as the future location.

In another embodiment, one or more users can be dynamically added to the social network of another. Proximity, time spent in proximity to one another, and/or frequency of contact can be used to dynamically add one user to the social network of another. The techniques can be used individually or in any combination. In illustration, groups of two or more users, e.g., mobile nodes, having a network presence can be identified as being proximate. As used herein, the term "proximate" can mean that two or more objects are located within a predetermined distance of one another. In one embodiment, two or more mobile nodes can be said to be proximate to one another according to the location at which the mobile nodes are detected. That is, the predetermined area may vary according to the location, or type of location, at which the mobile nodes are located.

For example, if the location is a residence, two mobile nodes located a distance of 20 feet from one another may be considered proximate since one may assume that the users within a same residence would likely know one another despite being 20 feet away from one another. Accordingly, the users, or mobile nodes, may be added to the social network of one another. A distance of 20 feet in a nightclub, however, is not indicative of proximity since one cannot infer that two users located a distance of 20 feet from one another are having social interaction. It may be the case that neither user knows or is aware of the other. Accordingly, to be considered proximate in a business or nightclub setting, a distance of one to three feet may be more appropriate for determining that two mobile nodes are proximate.

As noted, the amount of time spent and frequency of visits (being proximate) also can be evaluated to determine whether to dynamically add a user to the social network of another. Any of a variety of different mechanisms can be used to dynamically add users to a social network. As such, the particular ways in which users are added to the social network of another and the examples provided herein are not intended to limit the present invention in any way.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of predicting a future location of a first mobile node comprising:
   via a processor, determining a location of at least a second mobile node, wherein the second mobile node is associated with the first mobile node via a social network;
   via the processor, generating a list comprising at least one candidate destination determined, at least in part, according to the location of the first mobile node and the location of the second mobile node;
   for each candidate destination on the list, via the processor, calculating a probability that the first mobile node is in route to the candidate destination;
   via the processor, selecting a candidate destination, according to the probabilities, from the list as a predicted future location of the first mobile node; and
   via the processor, outputting the predicted future location of the first mobile node.

2. The method of claim 1, further comprising, via the processor, determining that the second mobile node is located within a predetermined distance of the first mobile node and that each candidate destination on the list is located within a predetermined distance of the second mobile node.

3. The method of claim 1, further comprising, via the processor, selecting the location of the second mobile node to be the at least one candidate destination of the list.

4. The method of claim 1, further comprising, via the processor, calculating a heading of the first mobile node, wherein calculating the probability further comprises increasing the probability for each candidate destination on the list located within a predetermined distance from a point on a path along the heading.

5. The method of claim 1, further comprising, via the processor, determining that the first mobile node is currently traveling along a route previously traveled by the first mobile node, wherein calculating the probability further comprises increasing the probability of each candidate destination on the list located within a predetermined distance of a point on the route currently traveled by the first mobile node.

6. The method of claim 1, further comprising, via the processor, identifying at least one candidate destination on the list as a destination previously visited by the first mobile node, wherein calculating the probability further comprises increasing the probability of each candidate destination on the list previously visited by the first mobile node.

7. The method of claim 1, wherein calculating the probability further comprises increasing the probability of each candidate destination according to a current time stamp and a schedule associated with the first mobile node.

8. The method of claim 1, further comprising:
via the processor, determining a measure of time that a third mobile node is proximate to the first mobile node; and
via the processor, selectively adding the third mobile node to the social network of the first mobile node according to the measure of time that the third mobile node is proximate to the first mobile node.

9. The method of claim 1, wherein a location of each of a plurality of second mobile nodes is determined, wherein calculating the probability further comprises:
via the processor, identifying each candidate destination on the list associated with two or more of the plurality of second mobile nodes; and
via the processor, for each identified candidate destination, increasing the probability of the candidate destination according to a number of the plurality of second mobile nodes associated with the candidate destination.

10. A method of predicting a future location of a mobile node comprising:
via a processor, determining a location for each of a plurality of mobile nodes associated with a base mobile node through a social network;
via the processor, for each of the plurality of mobile nodes, identifying at least one candidate destination within a predetermined distance of the mobile node;
via the processor, for each candidate destination, calculating a probability that the base mobile node is in route to the candidate destination, at least in part, according to a measure of connectivity between the base mobile node and the mobile node associated with each respective candidate destination;
via the processor, selecting a candidate destination, according to the probabilities, as a predicted future location of the base mobile node; and
via the processor, outputting the predicted future location of the base mobile node.

11. The method of claim 10, wherein identifying at least one candidate destination comprises, for at least one mobile node, identifying the location of the mobile node as the candidate destination associated with the mobile node.

12. The method of claim 10, further comprising, via the processor, identifying at least one candidate destination as a destination previously visited by the base mobile node, wherein calculating the probability further comprises, via the processor, increasing the probability of each candidate destination identified as a destination previously visited by the base mobile node.

13. The method of claim 10, further comprising, via the processor, determining that the base mobile node is traveling along a route previously traveled by the base mobile node, wherein calculating the probability further comprises, via the processor, increasing the probability of each candidate destination located within a predetermined distance of a point on the route currently traveled by the base mobile node.

14. The method of claim 10, wherein calculating the probability further comprises, via the processor, increasing the probability of each candidate destination according to a current time and a schedule associated with the based mobile node.

15. A computer program product comprising:
a computer-readable medium having computer-usable program code stored thereon to be executed by a processor for performing the steps of:
determining a location of at least a second mobile node, wherein the second mobile node is associated with the first mobile node via a social network;
generating a list comprising at least one candidate destination determined, at least in part, according to the location of the second mobile node;
for each candidate destination on the list, calculating a probability that the first mobile node is in route to that candidate destination;
selecting a candidate destination, according to the probabilities, from the list as a predicted future location of the first mobile node; and
outputting the predicted future location of the first mobile node.

16. The computer program product of claim 15, further comprising computer-usable program code for performing the step of determining that the second mobile node is located within a predetermined distance of the first mobile node and that each candidate destination on the list is located within a predetermined distance of the second mobile node.

17. The computer program product of claim 15, further comprising computer-usable program code for performing the step of selecting the location of the second mobile node as the at least one candidate location of the list.

18. The computer program product of claim 15, further comprising computer-usable program code for performing the step of calculating a heading of the first mobile node, wherein calculating the probability further comprises increasing the probability for each candidate destination on the list located within a predetermined distance from a point on a path along the heading.

19. The computer program product of claim 15, further comprising computer-usable program code for performing the step of determining that the first mobile node is currently traveling along a route previously traveled by the first mobile node, wherein calculating the probability further comprises increasing the probability of each candidate destination on the list located within a predetermined distance of a point on the route currently traveled by the first mobile node.

20. The computer program product of claim 15, further comprising computer-usable program code for performing the step of identifying at least one candidate destination on the list as a destination previously visited by the first mobile node, wherein calculating the probability further comprises increasing the probability of each candidate destination on the list previously visited by the first mobile node.

* * * * *